E. ARMBRUST.
AUTOMATIC MAGAZINE PHONOGRAPH.
APPLICATION FILED JUNE 27, 1917. RENEWED APR. 3, 1919.

1,304,246.

Patented May 20, 1919.
7 SHEETS—SHEET 1.

WITNESSES

INVENTOR
E. Armbrust
BY
ATTORNEYS

E. ARMBRUST.
AUTOMATIC MAGAZINE PHONOGRAPH.
APPLICATION FILED JUNE 27, 1917. RENEWED APR. 3, 1919.
1,304,246.
Patented May 20, 1919.
7 SHEETS—SHEET 2.
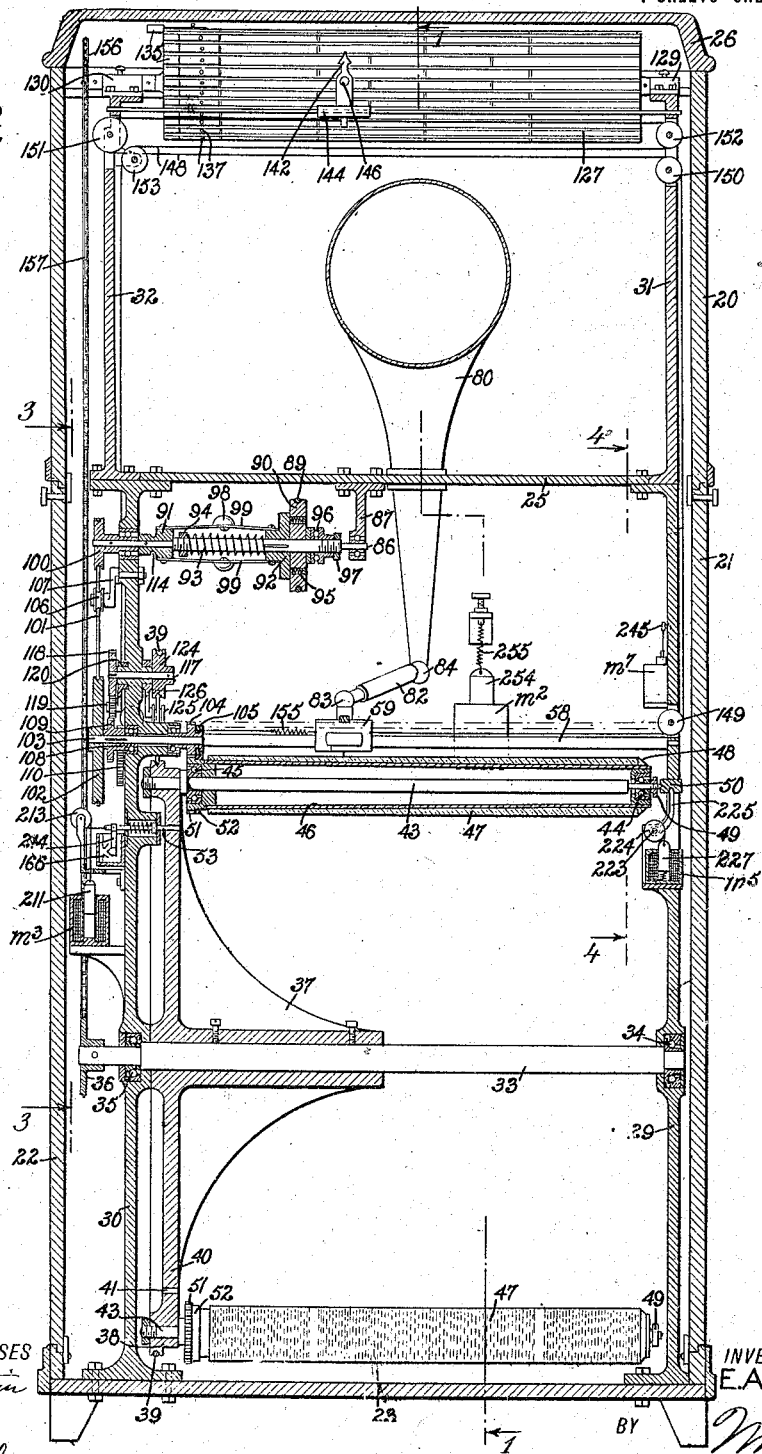

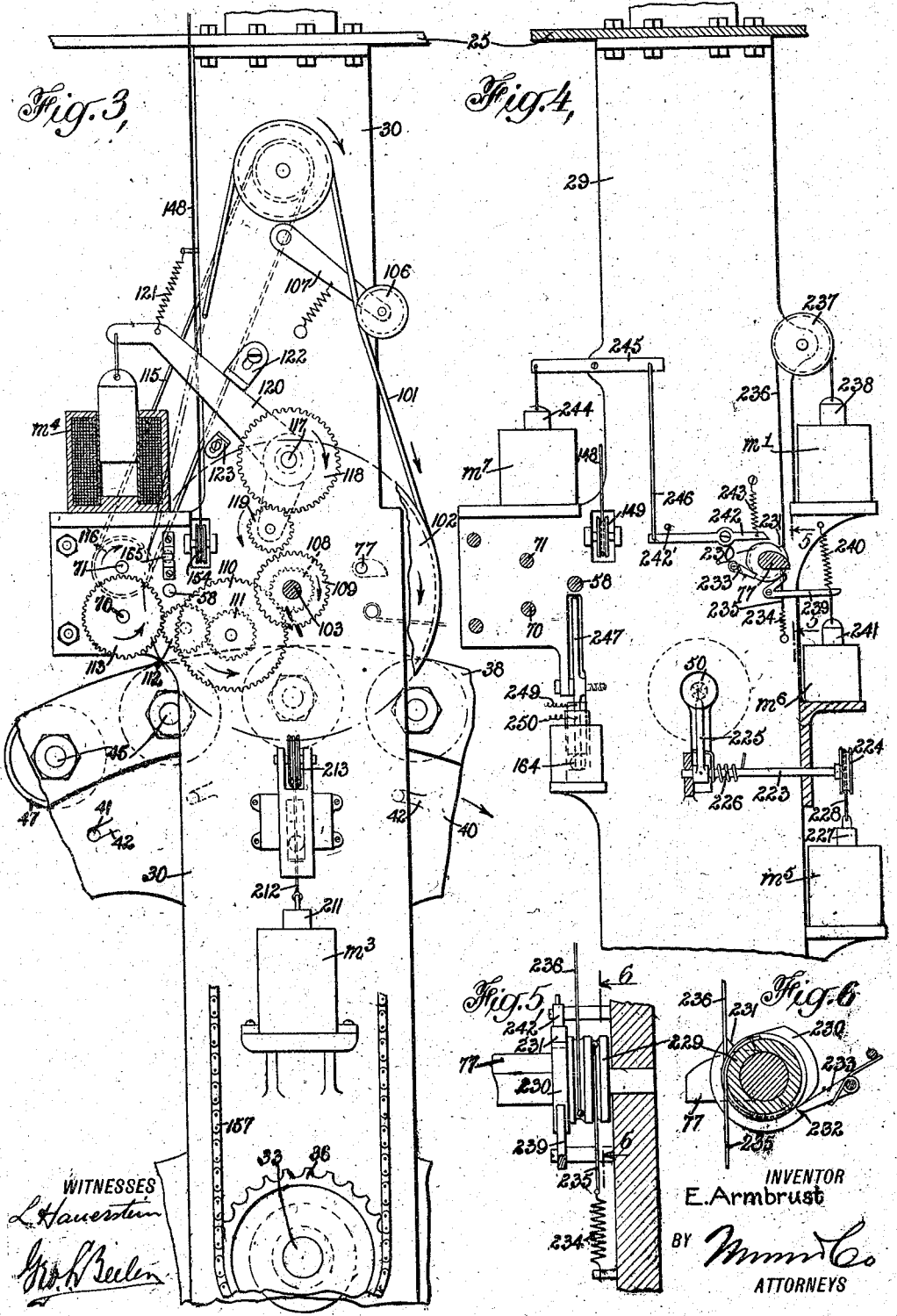

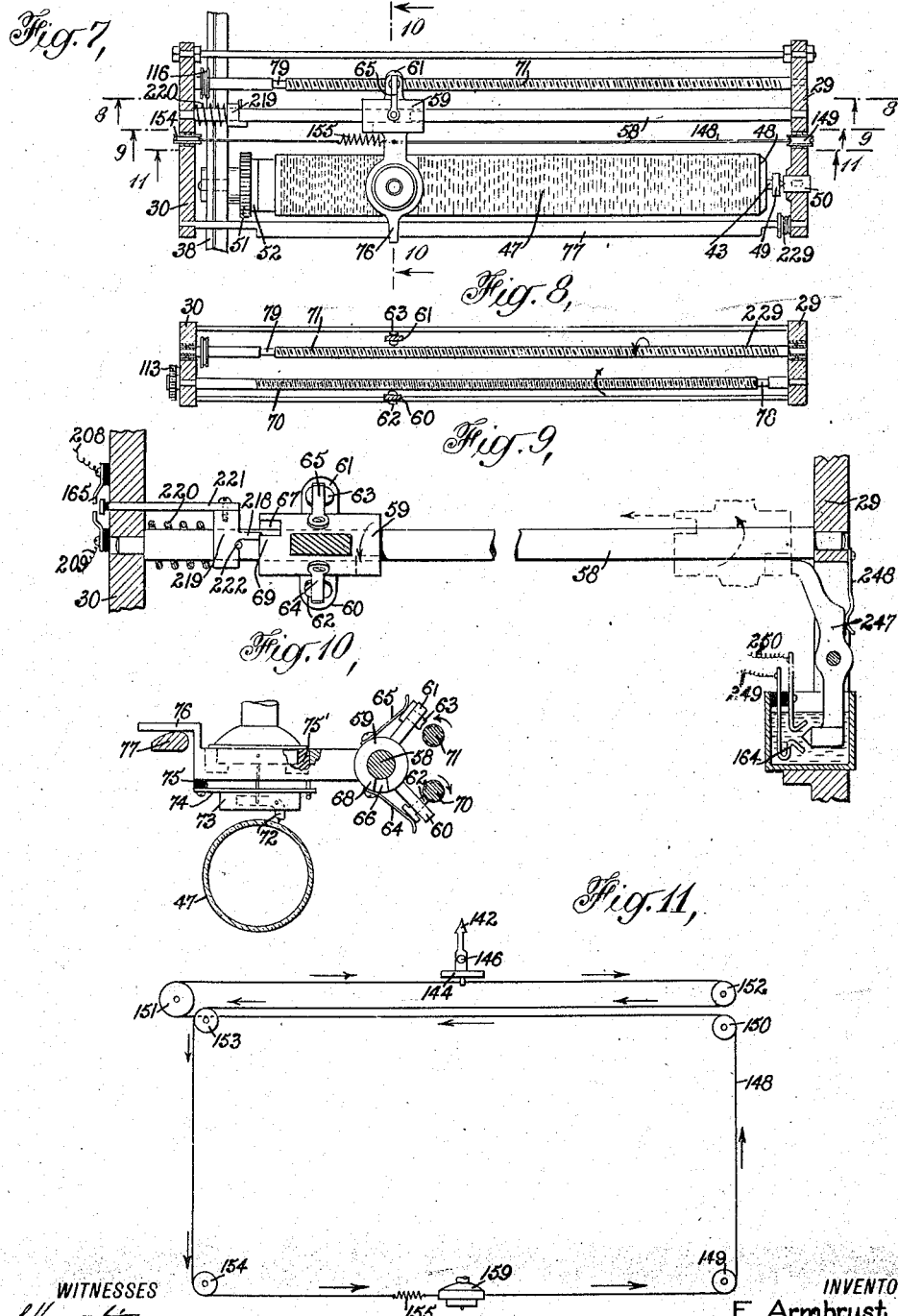

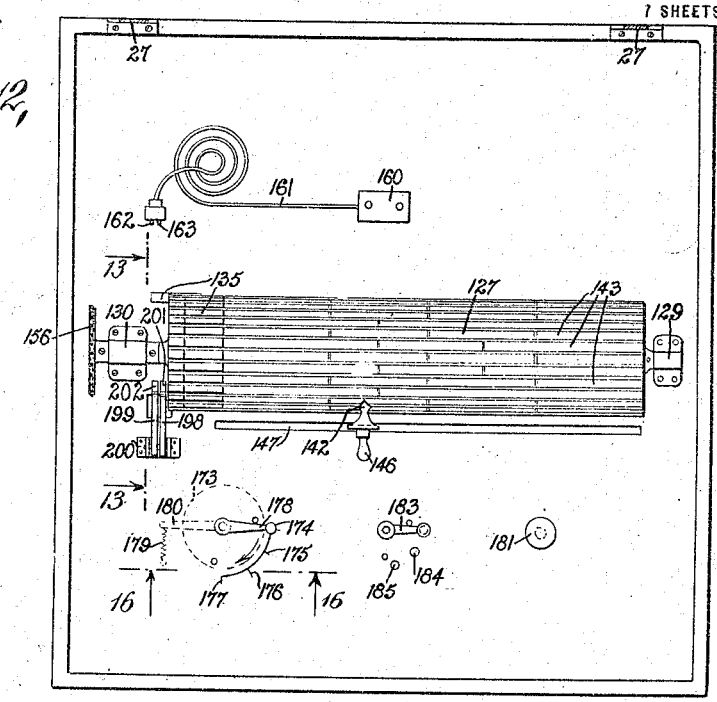

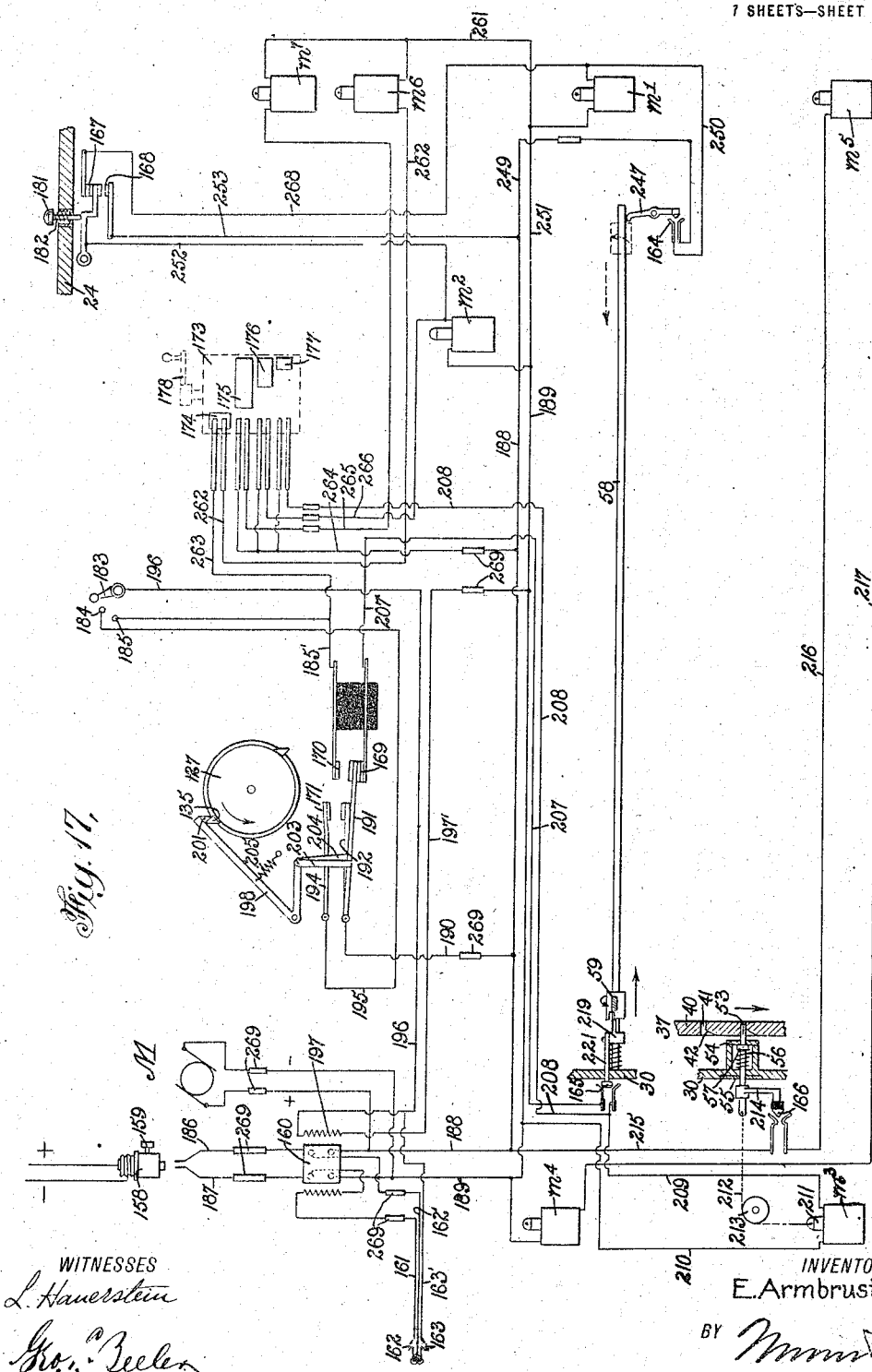

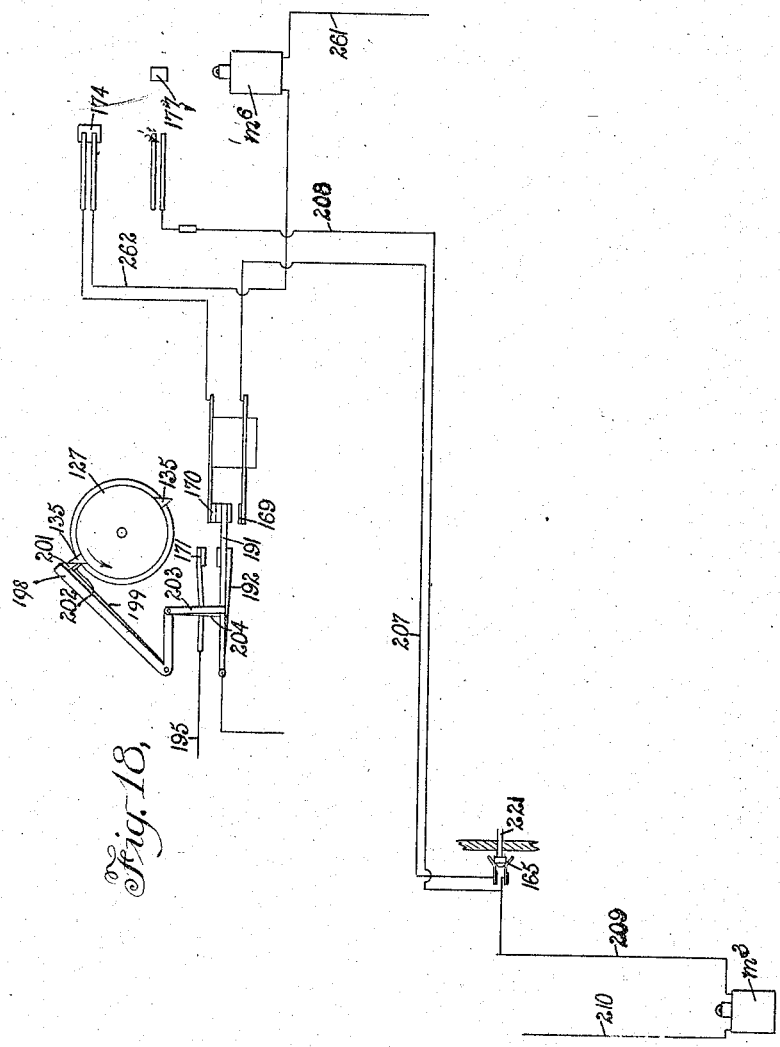

UNITED STATES PATENT OFFICE.

ELLWOOD ARMBRUST, OF GILLIES DEPOT, ONTARIO, CANADA.

AUTOMATIC MAGAZINE-PHONOGRAPH.

1,304,246.      Specification of Letters Patent.      Patented May 20, 1919.

Application filed June 27, 1917, Serial No. 177,234. Renewed April 3, 1919. Serial No. 287,313.

*To all whom it may concern:*

Be it known that I, ELLWOOD ARMBRUST, a citizen of Canada, and a resident of Gillies Depot, Province of Ontario, and Dominion of Canada, have invented a new and useful Improvement in Automatic Magazine-Phonographs, of which the following is a full, clear, and exact description.

This invention relates to sound reproducing machines and has particular reference to automatic phonographs. By the term "phonograph" as used herein I wish to cover any analogous type of sound reproducing devices irrespective of the manner of operation or the specific character of record used therein.

Among the objects of the invention is to provide a self contained cabinet or casing of compact form and convenient size, as for instance one that is similar in general appearance to an ordinary domestic disk record phonograph, adapted to carry in operative position a considerable number of selected records with means for bringing any or all of said records into playing position.

Another object of the invention is to provide a phonograph of the type above indicated with automatic selector and stop devices so arranged that the machine will operate automatically to play any selected group of records one after another and then stop at the end of the last record.

Another object of the invention is to provide a magazine wheel arranged for holding a number of selected records of the cylinder type, the holding means for each record being of a character suitable for holding such record permanently without danger of slipping, splitting or breakage.

A still further object is to provide a phonograph with improved driving facilities for the several records so arranged that each record will be rotated positively and yet without looseness or backlash.

A further object of the invention is to provide means for blowing the dust or fuzz from the region of the reproducer point at any time or automatically at the end of each record.

Another object is to improve the means for automatically stopping the travel of the reproducer at the end of each reciprocation thereof in either direction and to shift the same toward and from the record to provide for the interchange of the records automatically.

Another object is to provide a shifting and interchange mechanism for phonograph records operated automatically in connection with a pair of parallel screws having in connection therewith means for limiting the throw of the screw engaging means so as to be free from both of them for shifting the reproducer by hand when desired.

A further object of this machine is to provide a magazine drum having a plurality of individual records, an indicator drum, bearing cards or legends bearing the name, number, or other identifying means for the several records and means to drive one of said parts from the other with the same angular speed, there being provided a hand controlled pointer coöperating with the indicator roll to show to the observer at any time the precise record being played or selected.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Fig. 2 is a vertical transverse section on the line 2—2 of Fig. 1, looking toward the inside of the back of the machine.

Fig. 3 is an enlarged vertical elevation, partly in section on the line 3—3 of Fig. 2, showing the principal parts of the driving mechanism and especially the gear shifting devices.

Fig. 4 is a vertical detail, mainly in elevation but partly in section on the line 4—4 of Fig. 2, showing the principal automatic devices at the right side of the machine.

Fig. 5 is an enlarged detail in front elevation as seen from the line 5—5 of Fig. 4, and relating to the means for controlling the elevation of the reproducer.

Fig. 6 is a transverse sectional detail on the line 6—6 of Fig. 5.

Fig. 7 is a detail plan view showing particularly the relation of the reproducer carriage to a record being played and the means for traversing the carriage from one side of the machine to the other, Fig. 8 is a vertical section on the line 8—8 of Fig. 7 indicating especially the feed and return screws for traversing the reproducer carriage.

Fig. 9 is an enlarged vertical section indicating the parts from the line 9—9 of Fig. 7, parts being broken away.

Fig. 10 is a vertical transverse section on the line 10—10 of Fig. 7.

Fig. 11 is a diagram indicating the operative connection between the indicator pointer and the reproducer, these parts being located where they will be seen from the plane indicated on line 11—11 of Fig. 7.

Fig. 12 is a plan view of the upper deck of the cabinet, the lid being removed, and showing the principal indicator and controlling devices all of which are accessible directly within or below the lid.

Fig. 13 is an enlarged cross sectional detail on the line 13—13 of Fig. 12, indicating the mechanical contacts and electrical contacts controlled thereby.

Fig. 14 is a fragment of the indicator roll showing particularly the position of the endwise movable mechanical contacts.

Fig. 15 is a detail of the spring holding means for each of the sliding contacts, as will be seen from the line 15—15 of Fig. 14.

Fig. 16 is a vertical section approximately on the line 16—16 of Fig. 12, showing the controller drum in elevation.

Fig. 17 is a diagram indicating the principal electrical devices and parts intimately associated therewith.

Fig. 18 is a diagram showing the relative position of the movable contacts and parts associated therewith to illustrate particularly the action of the slidable contacts.

Fig. 19 is a detail view indicating a fragment of the magazine wheel and locking pin spaced therefrom; and Fig. 20 is a similar view showing the locking pin entering into a hole in the magazine wheel.

Figure 1:
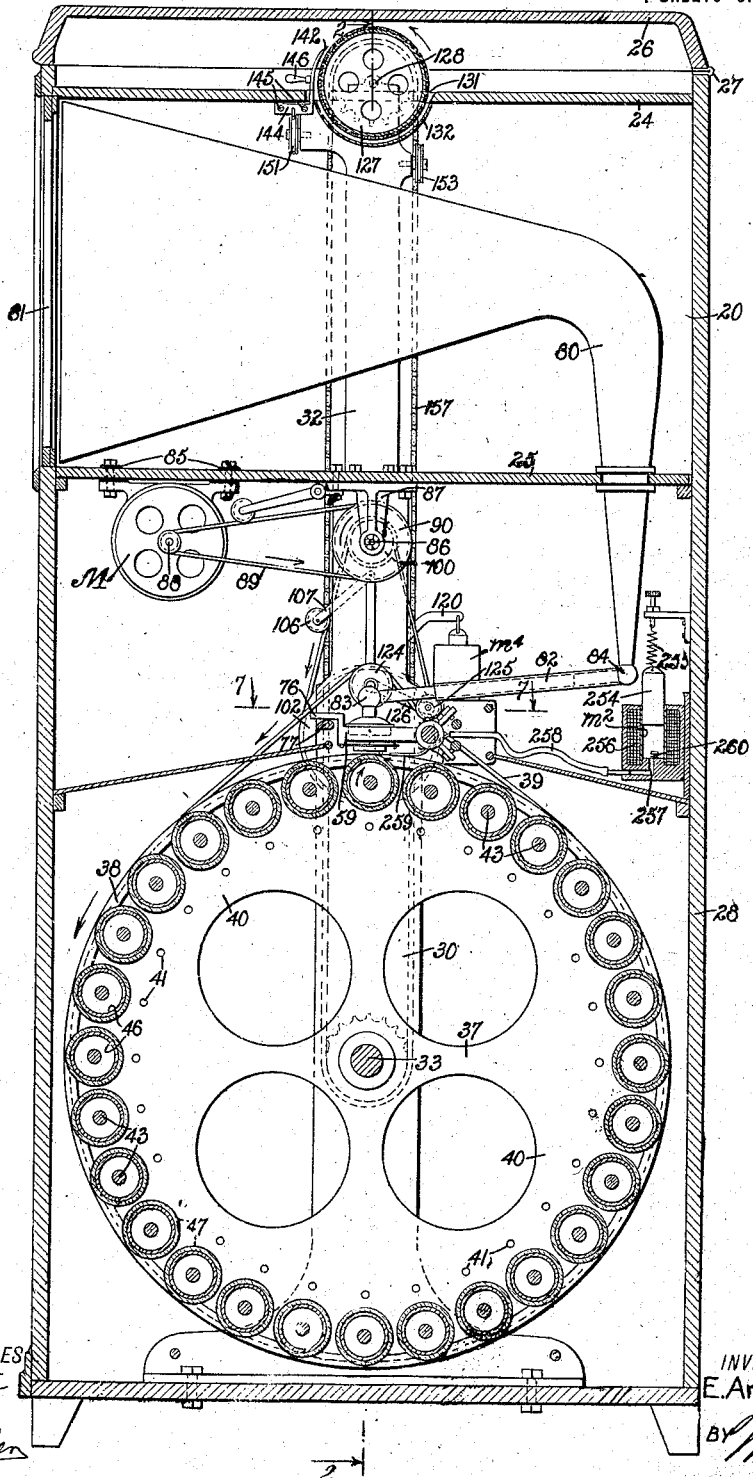
Figure 1 is a vertical section view of the complete machine on substantially the line 1—1 of Fig. 2, and looking toward the inside of the left side of the machine.

Referring now more particularly to the drawings I show a casing or cabinet 20 of any suitable size or design and including removable right and left side panels 21 and 22 respectively, a bottom 23, an upper deck 24, an intermediate deck 25, and a lid 26 hinged at 27 to the upper end of the back panel 28.

Secured in any suitable rigid manner upon the frame or bottom 23 are right and left upright standards 29 and 30, made preferably of aluminum and extending upwardly parallel to each other to about the deck 25. This deck is supported directly upon the upper end of these standards, and a pair of standard extensions 31 and 32 are erected upon the primary standards and reach about to the level of the upper deck 24 also in parallel relation to each other and approximately midway between the front and rear of the machine. All of these standards are constructed for maximum strength and rigidity and comparative lightness, and are calculated to support practically all of the operating parts.

33 indicates the main supporting shaft of the magazine wheel journaled horizontally and transversely of the machine in right and left anti-friction bearings 34 and 35 in the primary standards. To one end of this shaft is connected a sprocket wheel 36 and within the space between the standards is secured the magazine wheel 37 close, however, to the inner face of the primary standard 30. This wheel is constructed of any suitable skeleton form but having two essential features, namely, a grooved rim 38 for a driving belt 39 and a web 40 within the rim provided with a series of holes 41 arranged concentric with the axis of the shaft 33, each of the holes having a short groove or notch 42 at its front leading rearwardly toward the straight rear wall of the hole. See Fig. 17. A circular series of parallel spindles 43 are clamped rigidly in the rim 38, and on each spindle is journaled through suitable anti-friction bearings 44 and 45 a record holding mandrel 46 preferably faced with felt or some other suitable resilient material and of slightly tapered form toward the free right hand end for the accommodation of a record cylinder 47 adapted to be secured temporarily thereon and having a correspondingly tapered bore. The construction of the mandrel and the manner of fitting the record cylinder thereon is such that the cylinder will be held to the mandrel with sufficient reliability to prevent independent rotation and yet without danger of splitting or rupturing the cylinder on account of change of temperature or other conditions. Endwise displacement of the cylinder is prevented by means of an elastic rubber ring 48 fitted upon the free end of the mandrel and against the end of the cylinder. The free end of each spindle is reduced where it passes through the bearing 44 and is fitted with an adjustment nut 49 just beyond which the end of the spindle is tapered forming a small cone with which is adapted to cooperate an endwise slidable bearing cup 50 mounted in the standard 29 and whose function is to hold the otherwise free end of the mandrel and record steady while that particular record is being played. See Figs. 2 and 4. The left end of the mandrel constitutes a hub having formed on its surface a spur gear 51 and a friction rim 52 close alongside thereof, the effective surface of the friction rim coinciding with the pitch circle of the gear. The magazine wheel is normally held fixed from rotation by means of a locking pin 53 extending into one of the holes 41. This pin is fitted slidably in the standard 30 being supported in a pair of inner and outer plates 54 and 55 between which is arranged a spring 56 tending to hold the pin in locking position, said spring acting against a shoulder 57 at one end and the plate 55 at the other end. See Fig. 17.

58 indicates a cylindrical fixed guide rod supported in and extending between the standards 29 and 30 above the magazine wheel and just back of the vertical plane of the axis thereof. This rod constitutes the main support for the reproducer carriage 59 including a cylindrical hub fitted slidably directly upon the rod and provided with a pair of rigid divergent lugs 60 and 61 in which are slidably and non-rotatably fitted shoes 62 and 63 respectively. Said hub also carries a pair of leaf springs 64 and 65 bearing resiliently upon said shoes. See Figs. 9 and 10. The carriage 59 is provided at its ends with radial notches 66 and 67 forming offsets or shoulders 68 and 69 respectively. Just back of the rod 58 and parallel thereto are a pair of power screws arranged with their axes in the same vertical plane, a feed screw 70 and a return screw 71, with which said shoes 62 and 63 respectively coöperate in alternation. The free end of each shoe opposite its spring is shaped to coöperate with the thread of the corresponding screw. These screws as indicated are adapted to be driven constantly in opposite directions, the feed screw being designed so that its rate of rotation and pitch will correspond exactly to the record groove on the cylinder 47 and the return screw is formed with a quick pitch and adapted to be rotated at a comparatively high speed and hence is journaled preferably in anti-friction bearings.

The reproducer point is indicated at 72 and is carried by a body 73, supported on a spring 74, connected by a screw through a rubber washer or gasket 75, with the main portion of the carriage to prevent the transmission of mechanical sounds, a felt ring 75' also being interposed between the carriage and the attachment for the tone arm. The front end of the carriage comprises an upwardly and forwardly projecting finger 76 supported upon a horizontal transversely extending cam bar 77 journaled at its ends in the standards 29 and 30 for rotation through approximately 90 degrees. Fig. 10 shows this bar in position for supporting the carriage in normal playing position with the feed screw 70 acting through the shoe 62 to traverse the carriage toward the right. When, however, the cam bar is lifted or rotated in a clock-wise direction it will, acting through the finger 76, lift the reproducer point 72 from the record and bring the shoe 63 into engagement with the quick return screw 71. The screw 70 is provided at the right hand end with a groove 78 into which the shoe 62 is snapped by the spring 64, which automatically stops the traversing effect of this screw. Similarly the return screw 71 is provided at its opposite end with a groove 79 for a similar purpose.

A horn 80 projects through and is supported by the rear portion of the deck 25, the bell of the horn being located just within a suitable scroll or grill 81 at the upper front of the cabinet. The reproducer is connected to the small end of the horn by means of a suitable tone arm 82 of variable length, the same being shown as of telescopic parts connected by universal ball joints 83 and 84 to the reproducer and horn respectively so that while the reproducer carriage is being moved along the supporting rod 58 the tone arm accommodates itself accordingly in length and position. This tone arm also accommodates itself to the slight degree of rotation of the carriage around the axis of the rod 58 as controlled by the position of the cam bar.

Any suitable means may be provided to actuate this machine, but for practical purposes I employ an electric motor M secured to and suspended beneath the front part of the deck 25 through soft rubber washers 85 to eliminate the transmission of objectionable noises. See Figs. 1 and 2.

86 indicates a governor shaft journaled horizontally of the machine and substantially in a vertical central plane thereof with one end journaled in a bracket 87 and the other end in the upper end of the primary standard 30, anti-friction bearings preferably being employed. This shaft is adapted to be driven directly from the motor shaft 88 by means of a belt 89 acting over a pulley 90. This belt as are also the other principal belts is preferably made of round rubber or any other suitable material and of a practically noiseless nature. The motor is so designed as to operate the shaft at a slightly higher speed than the governor is intended to operate. The governor is mounted upon the shaft 86 and comprises a hub 91 keyed at one end and a hub 92 splined to the other end in proximity to the pulley 90. A spring 93 is coiled about the shaft between the hubs acting at one end against an adjustable nut 94 and at the other end against the slidable hub 92 tending to hold the face of the hub 92 against the driving face of the pulley 90. Suitable friction is provided for between these two faces through cork or similar plugs carried by the pulley and forced toward the governor hub by means of light coil springs 95. Since the driving pulley 90 is journaled on the shaft 86 for independent rotation, the end thrust incident to the action of the spring 93 is borne by an anti-friction thrust bearing 96, one portion of which is locked in desired position by means of a suitable lock nut 97. Centrifugally operated balls 98 are carried by leaf springs 99 having their ends connected to the hubs 91 and 92. When the speed of rotation of the governor is sufficient these balls flying out will withdraw the slidable hub 92 from the driving pulley against the force of the spring 93, according to the adjustment of the nut 94.

Keyed or otherwise secured to the outer end of the shaft 86 is a pulley 100 from which a belt 101 leads to a larger pulley 102 (see Fig. 3) fixed to a short jack shaft 103 journaled in the standard 30. Direction of movement of the belts and allied parts is indicated by arrows on the several figures. On the inner end of the jack shaft is secured a combined spur and friction pinion having parts 104 and 105 coöperating respectively with the parts 51 and 52 of the mandrel hub pertaining to the record in position to play. The meshing toothed gears insure positive rotation of the record and the coöperating friction surfaces insure steadiness of action with no backlash or looseness, for the best musical effect. Any suitable belt tightening pulley 106 mounted upon a spring pressed arm 107 acts upon the belt 101 to maintain suitable tension.

A double spur gear having parts 108 and 109 is fixed upon the jack shaft between the pulley 102 and the standard 30. A train of speed reducing gears 110, 111, 112 and 113 transmit the power from the pinion 108 to the feed screw 70 at a moderately low speed, depending upon the pitch of the screw.

The return screw 71 is operated from the pulley groove 114 formed in the governor hub 91 and a belt 115 operating over a pulley 116 fixed to the return screw, this action being more nearly direct from the motor than the means for driving the feed screw, is materially more rapid.

117 indicates a counter shaft journaled in the standard 30 above the jack shaft. On the outer end of this counter shaft is fixed a spur gear 118 meshing with an idler pinion 119 carried on a bell crank 120 journaled around the bearing for the shaft. This pinion 119 is held normally out of mesh with the gear 109 by means of a spring 121 holding the longer arm of the bell crank against an adjustable stop 122. When, however, the bell crank is swung down by any suitable means until stopped by another adjustable stop 123, the pinion 119 will be brought into driving engagement with the gear 109. By this means then the counter shaft will be rotated from the jack shaft. On the inner end of the counter shaft is fixed a pulley 124 having a groove in the plane of the groove of the magazine wheel and from which the belt 39 is driven for the purpose of rotating the magazine wheel when desired and the pin 53 is withdrawn. An idler pulley 125 carried by an arm 126 hung from a portion of the bearing for the counter shaft, bears upon the belt 39 to maintain uniform tension thereon. See Fig. 1.

As indicated in Figs. 2 and 7 each cylinder 47 is unusually long and adapted to carry records of various selections and of any desired length. As indicated for example at the bottom of Fig. 2 the cylinder is grooved for three records, those at the ends being about four minutes long and the one between them about eight minutes. This is mentioned simply to indicate that the individual records on the several cylinders may be of a great variety of lengths as well as musical or literary character. At 127 I incate an index roll, shown herein as mounted for rotation around a horizontal axis in the upper part of the machine parallel to the axis of the magazine wheel. The shaft 128 for the indicator roll is journaled in bearing boxes 129 and 130 supported primarily upon the standard extensions 31 and 32 respectively at about the level of the upper deck 24. The roll therefore lies in an opening 131 in the deck 24, the upper half of the surface of the roll being visible above the deck. 132 indicates a semi-cylindrical dust guard surrounding the lower half of the roll. The construction of the roll 127 will be understood best from Figs. 12, 13 and 14 and is in the nature of a hollow cylinder, the shell 133 of which is provided at the left end with a circumferential series of longitudinal parallel dovetail grooves 134, in each of which is slidably mounted a mechanical stop 135, the outer end of which is beveled on its front face at 136 and adapted to occupy any one of three different positions represented in Fig. 14 as A, B and C. Each of these stops is provided with a finger piece 137 projecting radially inwardly therethrough, the inner end of which projects through a slot 138 in the shell 133 and between a pair of springs 139 fixed by screws or the like 140 to the inner surface of the shell through plates 141. The springs of each pair are provided with a series of pockets a, b and c (Fig. 15) corresponding to the respective positions A, B and C in which said springs are adapted to hold the stop in practice. By grasping the finger piece 137 the operator may easily slide the stop from any position to the next forcing the stud or pin from one pocket to the next for it to be held automatically by virtue of the springs. The dovetail groove 134 for each stop holds the same securely from tilting or rotation with respect to the shell. The shell 133 of the indicator roll is provided with as many of these stops 135 as there are mandrels 46 for record cylinders, and suitable identifying means will be provided for the grooves of the indicator roll to correspond to the several record mandrels.

Likewise in longitudinal alinement with each of the stops 135 is provided a space for the name, number or other identifying means for the record selections of the cylinder pertaining to such groove and stop. As indicated furthermore in Fig. 12 the length of the several identification cards will be varied according to the length of the corresponding records so that a suitable pointer 142 operating over or along the face of the roll 127 and directed to one of the identification cards 143, will show precisely the name of the selection being played, the length of the record, and the portion of the record being rendered at any particular time. Said pointer 142 is carried by a slide 144 movable along a pair of guide rods 145 either by the operator's fingers applied to the handle 146, or automatically. The shank of the pointer 142 projects upwardly through a slot 147 in front of and parallel to the opening 131. The slide 144 is adapted to travel longitudinally along the indicator roll in the same manner as the reproducer carriage 59 travels longitudinally along the guide rod 58 and in the same direction. The means to effect this result is shown best in Fig. 11 as comprising a cable 148 attached to opposite sides of the reproducer carriage and attached also to the slide 144, said cable operating over a series of suitably located direction pulleys 149, 150, 151, 152, 153 and 154. A spring 155 is interposed in the cable 148 to maintain suitable tension thereon. The slide is free to move except for the cable connections along its slot 147, hence when the reproducer carriage is tilted to its mid position between the feed and return screws, effected by a one eighth rotation of the cam bar, the operator by grasping the finger piece 146 may move the pointer freely along the indicator roll for the purpose of adjusting the reproducer for the playing of another selection which will be identified by the particular card 143 indicated by the pointer. When, however, the carriage is reciprocated automatically in the usual way the index pointer will be moved therefrom in a corresponding direction through the cable 148. A sprocket wheel 156 of the same diameter as the wheel 36 is secured to the end of the roll shaft 128 and a link belt or roller chain 157 operates from one of these sprocket wheels to the other so that the indicator roll is rotated from the magazine wheel and at the same angular velocity to insure correspondence of position between each record cylinder and its index means.

I will now refer to a preferred embodiment or arrangement of controlling devices, most of which are automatic. Among these controlling devices may be noted from Fig. 17 the following: A circuit plug 158 with a snap switch 159 through which a current may be supplied to the motor through a magnetic cut-out 160 which may be controlled either by a three wire extension cord 161 with a pair of contacts 162 and 163 for hand operation from any desired distance from the machine or otherwise, a wire 162' leading from contact 162 to the cut-out 160. I show also a series of electromagnets identified by the characters $m^1$, $m^2$, $m^3$, $m^4$, $m^5$, $m^6$ and $m^7$. The magnets $m^1$ and $m^2$ are arranged in parallel, while the magnets $m^4$ and $m^5$ are arranged in series. I show also a plurality of switches and contacts 164, 165, 166, 167, 168, 169, 170 and 171, any or all of which are preferably adapted to make and break submerged in oil to prevent dangerous sparking. As an instance of an oil receptacle for this purpose reference is had to Fig. 13 showing at 172 an oil container for the pairs of contacts 169, 170 and 171. Making further reference to Fig. 17 I show a control drum 173 bearing on its surface a series of stepped contacts 174, 175, 176, and 177. See Fig. 16, for an elevation of this control drum to the axis of which is fixed a hand controller 178 through which the drum may be rotated in a clockwise direction, through about 90 degrees against the force of a spring 179 connected to an arm 180 tending to hold the drum in the normal position indicated in Fig. 16. Again, I indicate at 181 a push button adapted to break the contact at 167 and make the contact at 168 against the force of a spring 182 which holds the contact closed at 167 under normal conditions. Furthermore I provide a hand switch at 183 adapted to make contact at either 184 or 185.

The principal wiring, indicated in Fig. 17, will be identified as follows: From the motor M which gets its power through the main line wires 186 and 187, thereby typifying any suitable source of electrical energy, the current is conveyed through the trunk lines 188 and 189 to and through the several connections. From the trunk line 188 a branch 190 leads to a pair of contact bars 191 and 192 pertaining to the contacts 169 and 171 respectively, the contact 169 being normally closed and the contact 171 being normally open. Said bars 191 and 192 are both pivoted to a bearing block 193. See Fig. 13. A fixed contact spring 194 carries a stationary contact at 171 and a wire 195 leads thereto from the contact point 184, communication being through the switch 183 and wire 196 to the magnet 197 of the cut-out 160. A pair of bell crank mechanical contact devices 198 and 199 are pivoted to a bracket 200 just in front of the field of action of the mechanical stop slides 135, said bell cranks being provided with heads 201 and 202 respectively adapted to coöperate with the slides 135 in accordance with the B and C positions thereof. The heads just referred to have beveled faces against which the beveled faces 136 of said stop slides are adapted to wipe when the index roll rotates as shown in Fig. 13, assuming that said slides are projected from their normal A position. The bell crank 198 is connected by a link 203 with the contact bar 191, and the other bell crank 199 through a link 204 with the normally spaced contact bar 192. These bell cranks are held in position to be engaged by the beveled faces of the contact slides by virtue of a spring 205 acting toward an adjustable stop 206. If the contact slide 135 is set for the B position the head 201 only will be engaged thereby and the contact bar will be lifted, breaking the contact at 169 and completing the contact 170. The contact at 169 is connected to wire 207, the latter leading to the contact 165 thence through a wire 209, magnet $m^3$ and wire 210, back to the other trunk wire. The armature 211 of said magnet $m^3$ is connected through a flexible line 212 leading over a direction pulley 213 to the outer end of the locking pin 53. When the magnet is energized the pin is accordingly withdrawn from locking position setting the magazine wheel free to rotate. This pin, however, carries an arm 214 which carries the movable part of the contact 166 closing the contact through the wires 215 and 216 through the magnet $m^5$, wire 217 and magnet $m^4$ to the other trunk wire. The circuit is completed at the contact 165 automatically by operation of the carriage 59 when it reaches the limit of its return movement, the shoulder 69 of the carriage at this time striking against a lug 218 carried by a sleeve 219 slidable on the supporting rod 58 against the force of a spring 220. This sleeve carries a plunger 221 which reciprocates through the standard 30 and carries the movable part of the contact 165 insulated from the other parts of the device. The sleeve is held from rotation not only by the plunger 221 but also by a stop pin 222, the latter of which limits its inward movement under the force of the spring. As shown in Fig. 9 the carriage is just completing its return movement and about to close the contact at 165 and thereby energize the magnet $m^3$. The moment, however, that the carriage drops into playing position the shoulder 69 moves circumferentially far enough to allow the lug 218 to drop into the notch 67 setting the sleeve free to break the contact at 165 and effecting the subsequent breaking of the circuit at 166. The magnet $m^3$ remains energized until the contact 170 is closed and this is not closed until the contact 169 is broken. When the contact 170 is closed the wires 263 and 262 energize the magnet $m^6$. The interval of time between the deënergizing of the magnet $m^3$ and the entering of the pin 53 into the hole 41 is very brief, the magazine wheel 37 rotating through an arc about as long as the length of the slot or groove 42 on the web 40. Except as just stated the pin 53 ordinarily does not contact against the web 40. See Figs. 19 and 20. The rotation of the magazine wheel 37, acting through these sprocket wheels 36 and 156 and chain 157, controls directly the operation of the contacts 169 and 170, and indirectly the contacts 165 and 166. This latter is effected by the head 201 on the bell crank 198 riding over any slidable contact 135 that is set at the "B" position. While the contacts 135 are set at "A" position, the contacts 169 will not be broken and hence contact 170 will not be closed, so that the record corresponding to this contact 135 will be passed. This is true accordingly of all contacts 135 set at "A" position. The magnet $m^3$ remains energized during this movement.

Considering the case where only one contact 135 is set at "B" position, the magazine wheel will be rotated a full revolution or until this contact comes in engagement again with the head 201 when the record corresponding to this contact will be played through and again repeated. After the contact 165 is closed the magnet $m^3$ will remain energized until the contact 169 is broken, but this latter contact cannot be broken until a stop 135 is set at either its "B" or "C" position. While the case just cited would be unusual, yet if it were desired to have the instrument stop at the end of such record all that would be necessary to do would be to set the switch 183 on the contact 185 which would cause the stopping of the instrument at the end of the rotation of the magazine wheel. This is the principal use of contact 185. The contact 184 performs a similar function at the end of a group of stops placed at the "B" position and when the next one is set at the "C" position. The foregoing are the only uses of the switch when used in combination with the stops 135. Reverting again to the stop 135 raising the head 201 and causing the opening of the contact 169 and the closing of the contact 170, the closing of the latter contact causes the operation of the magnet $m^6$ and the dropping of the carriage 59 into playing position, this movement releasing the sleeve 219 and opening the circuit for the magnet $m^3$ at 165. This action takes place as soon as the contact 170 is closed and before the magazine wheel 37 has been stopped by the pin 53 entering the groove 40 and hole 41, when the circuit for both magnets $m^4$ and $m^5$ will have been opened at 166. As the magazine wheel has come to rest the bell cranks 198 and 199 will have ridden over the stop 135 and been brought to their inactive position by springs 205. In this inactive position contact 170 is open and contact 169 is closed, in preparation for the next cycle of operation. If the contacts 165 have not been broken, by reason of the lug 218 entering the slot 67 (see Fig. 9) the carriage 59 would not have had time to move to the right and open the contact 165, since the travel of the carriage in the playing position is relatively slow. The sleeve 219 is provided so that the contact 165 will always be opened before the contact at 169 is closed, after changing a record. This prevents repeating the operation of changing a record before it has been played through. It is intended to adjust the contacts so that the contact 165 will be opened before the magazine wheel has actually come to rest and is locked in this position for playing the next record. In other words, the contact 165 will be opened before the head 201 has ridden over contact 135 and brought back to its normal position closing the contact 169.

The magnet $m^5$ is supported upon the standard 29 adjacent to the slidable cup bearing 50. A rock shaft 223 is journaled in bearings and carries on its outer end a pulley 224 and has fixed to its other end an arm 225, the upper end of which is seated in a notch in said cup bearing. A spring 226 acts upon the arm tending to hold the cup bearing in position to support and steady the free end of the spindle 43, the arm oscillating around the axis of the rock shaft in the plane of the axis of the spindle. The plunger 227 of the magnet $m^5$ is connected to the pulley 224 by a flexible line 228 and is so arranged that when the magnet is energized through the closing of the circuit at 166 the cup bearing is withdrawn endwise from the end of the spindle to permit free movement of the magazine wheel, the bearing coming back again to its normal steadying position by virtue of the spring 226 when the magnet $m^5$ is deënergized and after the magazine wheel has been given the desired amount of rotation.

The magnet $m^4$ is the means I provide for shifting the gear 119, see Fig. 3, so as to initiate the rotation of the counter shaft 117 and the rotation of the magazine wheel from the motor as previously set forth. The magnets $m^4$ and $m^5$ being connected in series are energized and deënergized simultaneously. The energy of the magnet $m^3$ which controls the circuit of the magnets $m^4$ and $m^5$ is maintained so long as the contact 165 is closed, and this condition obtains until the cam bar 77 and reproducer carriage are lowered to playing position, or until the spring 220 is permitted to force the sleeve 219 toward the pin 222.

Referring now to Figs. 4, 5 and 6 I will describe the means for controlling the rotation and position of the cam bar 77. 229 indicates a double pulley fixed to the right hand end of the cam bar and provided with a flange 230 having a pair of notches 231 and 232 shown as arranged opposite each other and having shoulders facing in opposite directions circumferentially. A spring pressed pawl 233 acts normally in the notch 232 so as to limit the downward and forward rotation of the cam bar under the normal tension of a spring 234 connected through a line 235 secured on the front face of the pulley 229. In the other portion of the pulley is connected another line 236 which leads upwardly over a pulley 237 to the armature 238 of the magnet $m^1$. The force of this magnet is sufficient to lift the cam bar and rotate the pulley and the bar through a one quarter rotation where it will be locked by means of a dog 239 to which is attached a spring 240 tending to snap the point of the dog into the notch 232. The armature 241 of the magnet $m^6$ is attached to the dog 239 for the purpose of releasing this dog against the force of the spring 240 when the cam bar is to be lowered and the selection is to be played. The magnet $m^6$ may be called the starting magnet. The active position of the dog 239 is the one in which the carriage is operating in its return movement with the shoe 63 in engagement with the screw 71. Above the notched flange 230 is located a pawl 242 the point of which is held up normally by means of a spring 243 so as not to resist the full quarter turn of the pulley. The armature 244 of the magnet $m^7$ is connected to this pawl through a lever 245 and link 246 so as to bring the point of the pawl into the notch 231 so as to limit the rotation of the pulley to its one eighth turn or so that the reproducer carriage will be held in its mid position so as to be free to reciprocate along the guide bar 58 in either direction independently of the feed and return screws.

Attention now being called to Figs. 9 and 17 I show a lever 247 which by virtue of a leaf spring 248 normally holds the movable part of the contact 164 open. The free end of this lever lies in the path of the shoulder 68 at the right hand end of the carriage 59 while the carriage is making its playing movement so that at the completion of this movement of the carriage the contact is closed at 164 completing the circuit through magnet $m^1$, through wires 249, 250, and 251, for magnet $m^2$ through wires 249, 250 and 268, contact 167 and wires 252 and 251. The moment, however, that the reproducer is lifted the free end of the lever 247 snaps into the notch 66 breaking the circuit 164.

The purpose of the magnet $m^2$ is to blow the dust or fuzz from the record that has accumulated because of the action of the reproducer point. This operation takes place automatically each time the carriage completes its playing movement through the automatic closing of the circuit at 164, but the actuation of the magnet $m^2$ may be effected at any time by hand by depressing the button 181 completing the branch circuit through the wires 252 and 253 at the contact 168. See Figs. 1, 2 and 17. The armature 254 of the magnet $m^2$ acting against the force of a spring 255 tending to hold it up, serves as a piston fitting slidably in a nonmagnetic lining 256 surrounded by the winding of the magnet. From a port 257 in the bottom of this cylinder is a tube having a flexible portion 258 which leads through the reproducer carriage with a nozzle 259 directed to the reproducer point. When the magnet $m^2$ is energized its plunger piston 254 forces a puff of air through the flexible tube and nozzle to blow off the fuzz. The bottom of this air cylinder is provided with a suitable buffer 260 to prevent noise and the sticking of the plunger.

The starting magnet $m^6$ has lead wires 261, 262 and 263 adapted to complete the circuit therethrough through the contacts 174 and 170 when the contact bar 191 is lifted by the mechanical contact 201 with the sliding stop at the B position. The contact 185 is only to operate when it is desired to have the instrument stop after the record in position has been played through and another is brought into playing position. In starting the instrument again all that is necessary is to open the switch 183, or off of contact 185, and start the motor through switch 160.

Referring now again to the controller drum 173, see Figs. 16 and 17, it will be noted that the contact 174 is normally closed while the other contacts 175, 176 and 177 act successively to close their respective pairs of contact springs on rotation of the controller drum and the breaking of the contact at 174. This controller drum is designed to be operated primarily by hand for the selection of certain records. When the contact is broken at 174 the magnet $m^6$ is dead. When the contact 175 is closed the energy from the trunk wire 188 passes through the wires 264 and 265 through the magnet $m^7$ which fixes the stop pawl 242 to check the cam bar and carriage at mid position so that the operator by grasping the finger piece 146 may shift both the indicator pointer and the carriage freely. This condition of the magnet $m^7$ obtains also while the contact 176 closes its circuit through the wires 264 and 266 to energize the magnet $m^1$ to lift the carriage through the wires 252 and 268. The final contact 177 of the controller drum closes its contact through the wires 264, 208 and 209 to close the circuit through the magnet $m^3$, providing for the rotation of the magazine wheel until the desired record shows up on the index card and when the controller handle 178 is brought back to its normal position the contact 174 will be closed so as to initiate the playing of the record thus selected.

Any or all of the connecting wires are preferably provided with safety fuses 269 to protect the main circuit in the instrument. These fuses may be placed at any convenient place such as on the upper deck 24 where their condition may be easily seen or a fuse replaced by the lifting of the cover.

The purpose of Figs. 18, 19 and 20 is to illustrate the relative positions of the bell cranks 198 and 199 with respect to the slidable contacts 135, the locking pin 53, the groove 42, and the hole 40 in that part of a cycle where they operate to stop the magazine wheel 37 and cause the instrument to start playing the record just brought into playing position. It will be noted that the head 202 will have to ride up on the slidable contact 135 higher to close the contact 171 than the head 201 does to close the contact 170, thus retarding the action of head 202 so that the contact 170 will have performed its function before contact 171 has opened the circuit at 160. Fig. 19 shows the point at which the magnet $m^3$ is intended to be deenergized, the pin 53 being just about to enter the groove 43. Fig. 20 shows the relative position of the locking pin to the hole 41 when the contact 166 will be broken.

By way of further explanation of the mechanism hereinbefore described and with reference to Fig. 17, if the switch 183 be placed on contact point 184 while the instrument is in operation and with all the stops 135 at "A" and "B" positions, no effect will result, but if one of the stops 135 were set at "C" position then when that particular record comes into playing position the head 202 riding over such stop would operate the contact 171 to open the switch 160 and stop the instrument. To accomplish this a current will be led from main 188, by wire 190, arm 192, contact 171, spring 194, wire 195, contact 184, switch 183, wire 196, magnet winding 197, and by wire 197' leading to the other main 189. It will thus be seen that the switch contact 184 is not absolutely essential but is included to make the operation more flexible. The contact 185 is necessary to stop the instrument at the end of each record when desired to operate the machine this way, this function being the only reason for playing it as indicated. To operate the cut-out 160 the current will be led from main 188, by wire 190, arm 191, contact spring 170 to which wire 263 is joined, branch wire 185' from 263 to contact 185, switch 183, wire 196, magnet winding 197, and wire 197' to the other main 189 or to 251. To use the extension wire 161 to start or stop the instrument it is necessary to place the switch 183 on its off position as shown in Fig. 17 and to set any or all of the stops 135 at either their "B" or "C" position as is done when setting the instrument to play selected records as explained below. Supposing that the instrument is stopped, stops 135 being set as desired, switch 183 off, and the instrument connected to the mains by the plug 158 and switch 159 on, it will only be necessary for the operator to take the extension cord 161 to whatever place he wishes to be and press the contact 162 to start the instrument, and when he wants it to stop he presses the contact 163. In the stopping action the current will be led from the upper right live terminal of the switch 160 by wire 162' common to both contacts 162 and 163, through contact 163 and wire 163' connecting it to wire 196, to magnet winding 197, and thence to the other main 189. In the starting operation the current will pass through the common connection 162' by closing contact 162, to the closing coil magnet winding thence to the upper left live terminal of the switch 160, completing the circuit. The purpose of the extension cord 161 is to relieve the operator from the necessity of leaving his place to start or stop the instrument when it is desired to use it for playing only intermittently, the instrument playing automatically while in operation.

To select a number of records or to set the stops to play the same automatically it will be necessary to see that the switch 183 is off and the plug 158 connected with the switch 159 is on and then closing the switch 160 by means of the contact 162 or by the other hand means to be provided. When the motor is started grasp the handle 178 in the left hand and move the same gently to the position of contact 176, the left hand holding the handle in this position while the right hand is used to set the desired stop 135. When all of the stops accessible have been thus set the left hand is then used to bring the controller to the position of contact 177 again to start the further rotation of the index cylinder 127 and so on until all of the desired stops have been set. The act of bringing back the controller 178 to the position of contact 174 will start the instrument playing the records selected. If a particular selection is desired the controller will be taken hold of at any time to rotate the index roll far enough so that by bringing it to the position of contact 176, the rotation will stop at the correct record, and while the controller is still held at 176 the handle 146 may be grasped in the right hand and the reproducer thereby raised at the correct starting point of the particular record selected by means of the indicator 142 and the legends 143, the legends having marks to indicate the exact length of the selection. After this adjustment is effected with the controller brought back to the contact 174 the instrument will be automatically started to play that particular selection. In moving the indicator and reproducer from side to side in placing the indicator it is not necessary to move it so far as to close either of the electrical contacts 164 and 165 at the end of its travel. These are held open by springs and require more pressure to move the indicator, thus showing the operator that the reproducer is against one of the contacts. The playing point of a record starts at the point where the carriage 59 comes in contact with sleeve 219, so that it is never necessary, in the hand selection of records, to move the carriage so far to the left as to close the contact 165, however, no harm would result by such closing of the contact 165 other than the undesired rotation of the magazine wheel, and in like manner if the contact 164 at the right were closed no harm would result.

To trace the connections from the use of the controller, the motor being considered as running and the indicator being at the end of a selection other than the last one of a series, bringing the controller to contact 175 opens the circuit for magnet $m^6$ at 174 and closes the circuit for magnet $m^7$ through the wire 264, contact 175, wire 265, magnet $m^7$, and wires 261 and 251 or 189. This action limits the rotation of the cam bar 77 so as to free the shoes 62 and 63 from the power means and allowing for free movement of the reproducer through the handle 146 when the controller is rotated to the contact 176, this by energizing magnet $m^1$ through wires 188 and 264, contact 176, wires 266 and 252, contact 167, wire 268, magnet $m^1$, and wire 251, thus completing the circuit and causing the armature of magnet $m^1$ to rotate the cam bar 77 to the extent permitted by the dog 242, previously operated by the magnet $m^7$ from contact 175. The shoe 62 and 63 at this time are free from their respective screws 70 and 71. While the foregoing parts remain active a further rotation of the controller 173 brings contact 177 into action to close the circuit for the magnet $m^3$, thus starting the rotation of the magazine wheel and index roll, which operation will continue as long as the contact 177 is closed. As soon as this contact 177 is opened the pin 53 will enter the next locking hole 41. After the circuit is thus broken, because in using the controller the contact 165 will be open, the instrument will not start to play until the contact 176 is opened which cuts out the magnet $m^1$ and allows the spring 234 to bring the cam bar 77 back to playing position. After the controller is moved from contact 177 to contact 176 it is then brought to 174 when the instrument will again play automatically. In using the controller the switch 183 will always be open as well as contacts 162 and 163. Magnet $m^2$ will operate with magnet $m^1$ in this case as it does when playing under the automatic controls. The circuit to operate magnet $m^3$ by the controller is as follows: Main 118, wire 264, contact 177, wire 208, wire 209, magnet $m^3$, and wire 210 to the other main 189. In using the stop 135 in "C" position to stop the instrument in connection with the switch 183, the head 202 will ride nearly to the top of said stop 135, and contact 171 being then closed will operate the cut-out 160 by means of the magnet 197. Since the head 201 had ridden to the highest point on the stop 135 ahead of the head 202, the head 201 will already have opened the contact at 169 and closed the contact 170 before the contact 171 has had time to operate which will allow the reproducer to be set for playing and to bring the magazine wheel to a stop at the next hole 41. The switch 160 will be opened before the wheel comes to a stop so that the momentum of the wheel will carry it to the next hole 41 also moving the active stop 135 so that the heads 201 and 202 will both ride over the top of the stop 135 and are brought to their normal inactive position by virtue of the springs 205.

I claim—

1. In an automatic phonograph, the combination of a magazine wheel, a series of records supported at one end thereon, means to rotate the wheel so as to bring selected records into playing position in succession, temporary supporting means for the free end of the record being played, and a pair of magnets arranged in series serving to actuate the wheel rotating means and the releasing of the temporary holding means simultaneously.

2. In an automatic phonograph, the combination of a mandrel, means to support the mandrel for free rotation in playing position, a long record secured to the mandrel and bearing a plurality of selections to be played in succession, a reproducer coöperating with the record, means to cause the travel of the reproducer from one end of the record to the other positively; said travel causing means being timed accurately with the grooving of the record selections, and means to rotate the mandrel and record and comprising a pair of combined spur and friction wheels, the spur wheel insuring proportional travel of the reproducer and the feed of the record and the friction wheel preventing disturbances due to backlash.

3. In an automatic phonograph, the combination of a series of records, means to support the same and bring them in succession into playing position, index means bearing a corresponding series of legends to indicate the several selections and the lengths thereof carried by the several records, means to connect the record operating means and the index means for simultaneously proportional movement, a reproducer movable along the respective records, and an indicator connected with the reproducer and movable thereby and adapted to point out on the index means the particular record being played, the length thereof and the particular part of the selection being rendered at any particular time.

4. In an automatic magazine phonograph, the combination of a magazine wheel, a series of records carried by the wheel and brought thereby into playing position in succession, a reproducer coöperating with the records, means to positively cause the travel of the reproducer in proportion to the grooving of the records, index means, a series of identifying devices corresponding to the several records and selections carried thereby, the selections being of variable lengths and the identifying means on the index device being similarly of varying lengths, connections between the magazine wheel and the index means to cause simultaneous movement thereof, and an indicator connected to the reproducer and movable simultaneously therewith and in the same direction, said indicator always pointing to that part of the identifying device corresponding to the part of the selection being played.

5. In an automatic phonograph, the combination of selective record devices, means to control the movement and position of the same, a reproducer coöperating with the several records, an index device, identifying means carried by the index device and corresponding to the several records and selections thereon, connections between the index device and the record support controlling means, an indicator coöperating with the identifying means on the index device, and a flexible cable connecting the indicator to the reproducer to insure simultaneous movement thereof.

6. In an automatic phonograph, the combination of a series of records bearing selections of variable lengths, means to support and actuate the records bringing them into playing position in succession, an index device, identifying means on the index device corresponding to the several records and to the names and relative lengths of the selections carried thereby, a reproducer coöperating with the several records, means to positively actuate the reproducer lengthwise of the records, an indicator pointer coöperating with the several identifying means, and connections between the reproducer and the indicator pointer to positively cause the movement of the latter from the reproducer in accordance with the record and selection being played.

7. In a phonograph, the combination of a series of records carrying selective selections, means to actuate the records to bring them into playing position in succession, a reproducer coöperating with the records, means to hold the reproducer spaced from the records, index means carrying identification devices corresponding to the several records and selections carried thereby, means to actuate the index means from the means to actuate the records, an indicator coöperating with the index means, and means connecting the reproducer to the indicator whereby movement of the indicator will cause a corresponding movement of the reproducer.

8. In an automatic phonograph, the combination of a guide bar, a series of records, means to support and carry the records into playing position adjacent to said bar in succession, a reproducer supported upon said guide bar for reciprocation thereof and tilting therearound, an electromagnet for tilting the reproducer away from each record at the end of the playing thereof, means to energize said magnet including a normally open contact and a movable switch therefor adapted to be struck by the reproducer at the end of its playing movement, said reproducer being provided with a notch into which said switch is adapted to drop to automatically break the circuit when the reproducer is tilted, and means coöperating with the tilting means to hold the reproducer tilted until a succeeding record is to be played.

9. In an automatic phonograph, the combination of a guide bar, a normally open contact and a plunger to close the same adjacent to one end of the bar, a sleeve supported upon the bar connected to said plunger, a reproducer slidable along and tiltable around the bar, said sleeve being provided with a lug projecting toward the reproducer and the reproducer being provided with a notch, one wall of the notch being adapted to strike the lug and thereby close the contact when the reproducer reaches the end of one reciprocation, the lug and notch being so arranged that when the reproducer is tilted the plunger will be released to break the contact prior to the return movement of the reproducer, and means to control the tilting movement of the reproducer.

10. In an automatic phonograph, the combination of a magazine wheel having a rim and web adjacent thereto, said web being provided with a circular series of stop holes, a series of records carried by said rim, one for each hole, a spring pressed locking pin coöperating with the respective holes in succession according to any selected records to be played in succession, an electromagnet to withdraw the pin from the holding position, means to rotate the magazine wheel to bring the records into playing position in succession, means including a normally open switch closed by withdrawal of said pin to initiate the rotating means, said pin after withdrawal being adapted to coöperate with the slotted face of the web after the withdrawing magnet therefor is deënergized, a reciprocating reproducer, means to positively move the same, and a normally open contact in circuit with said pin controlling magnet to energize the same automatically when the reproducer reaches a certain point in its reciprocation.

11. In an automatic phonograph, the combination of a magazine wheel comprising a rim and an adjacent web, the web being provided with a series of stop holes and having a groove leading into each hole from the front thereof, a series of record supporting means carried by the rim adjacent to the several holes, a locking pin coöperating with the successive holes to control the rotation of the wheel, an electromagnet to withdraw the pin from locking position to initiate the action of the rotating means for the wheel, the end of the pin being adapted to enter the next stop hole through its groove.

12. In an automatic phonograph, the combination of a series of records, means to support and bring the records into playing position in succession, a reproducer, means to reciprocate the reproducer along the several records in succession, magnetic means to lift the reproducer at the end of each record, magnetic means to remove the dust from the region of the reproducer, and means to energize both magnetic means simultaneously and automatically.

13. In a phonograph, the combination of a record, a reproducer, means to actuate the record and reproducer for playing the record, means to blow the fuzz from the region of the reproducer, said blowing means comprising an electromagnetic winding constituting a cylinder and an armature constituting a piston slidable therein, and means to automatically energize said electromagnet to cause a puff of air to be conveyed to the reproducer when the reproducer reaches the end of the record.

14. In an automatic phonograph, the combination of a series of records, means to support and carry the records into playing position in succession, a reproducer, means to actuate the reproducer and the record being played, an electromagnetic blower to remove the fuzz from the region of the reproducer, an electromagnet to lift the reproducer at the end of each record and arranged in series with the dust blower, and means actuated by the reproducer to energize both electromagnets simultaneously.

15. In a phonograph, the combination with a record, a reproducer and means to actuate the same, of an electromagnetic blower for removing the dust from the region of the reproducer, means to initiate the action of said blower means at any time during the playing of the record, and automatic means to initiate the action of the blower at the end of the playing of the record.

16. In an automatic phonograph, the combination of a magazine wheel, a series of records carried thereby, an index roll journaled for rotation around an axis parallel to the axis of the wheel, connections between the index roll and the wheel to cause both to rotate simultaneously at the same angular speed, sound reproducing devices coöperating with the records and controlling devices for the sound reproducing devices including a series of slidable stops carried by the index roll, one stop being provided for each record and the identification means therefor carried by the index roll, and said slidable stops being adjustable so as to occupy three different positions, namely, the normal idle position, the mid position to cause a record to be played and further rotation to bring another record into play, and a third position to cause the stopping of the machine.

17. In automatic controlling devices for phonographs, the combination with sound reproducing means, of a rotary member, a series of movable stops carried thereby and adjustable to different operative positions, and a plurality of bell crank mechanical stops adapted to be engaged and operated by said movable stops.

18. The combination with sound reproducing means, a motor for actuating the same, and a series of circuits and switches to control the action of the motor, of a rotary member, a series of selective stops movably connected to the rotary member, and a plurality of independently operated bell cranks arranged in the path of movement of the aforesaid stops when they are adjusted into operative position for controlling the action of the electric switches.

19. The herein described rotary index roll for automatic phonographs, the same comprising a slotted body, a series of identifying means for records fitted in the slots, a series of switch controlling stops slidably fitted in the ends of the body slots and adapted to be projected beyond the end of the roll to different distances, and a multiple stage spring device adapted to hold each stop in any one of its intended adjusted positions.

ELLWOOD ARMBRUST.